United States Patent [19]
Bechtel

[11] 3,842,654
[45] Oct. 22, 1974

[54] APPARATUS FOR THE DIRECT MEASUREMENTS OF THERMAL STRESSES

[75] Inventor: Thomas F. Bechtel, Greenville, S.C.

[73] Assignee: The United States of America as represented by the Secretary of the Air Force, Washington, D.C.

[22] Filed: Feb. 14, 1973

[21] Appl. No.: 332,539

[52] U.S. Cl. ............................................. 73/15.6
[51] Int. Cl. ......................... G01n 3/08, G01n 25/00
[58] Field of Search ............................. 73/154, 15.6

[56] References Cited
UNITED STATES PATENTS
2,717,300  9/1955  Tyne ............................. 73/15.6 X
3,075,378  1/1963  Bernard et al. ..................... 73/15.6
3,534,597  10/1970  Webb ............................... 73/15.6
3,665,751  5/1972  Paine et al. ......................... 73/15.6

Primary Examiner—Herbert Goldstein
Attorney, Agent, or Firm—Harry A. Herbert, Jr.; Arsen Tashjian

[57] ABSTRACT

A sample is constrained between a support and a rigid member. Two spaced load measuring means extend outwardly from the outer surface of the rigid member to another support which is linked to the first support by a rigid base. The application of heat to the constrained sample generates stress which is measured by the load measuring means to indicate the direct thermal stress line load ($N_T$) and the thermal stress moment ($M_T$).

2 Claims, 1 Drawing Figure

PATENTED OCT 22 1974    3,842,654
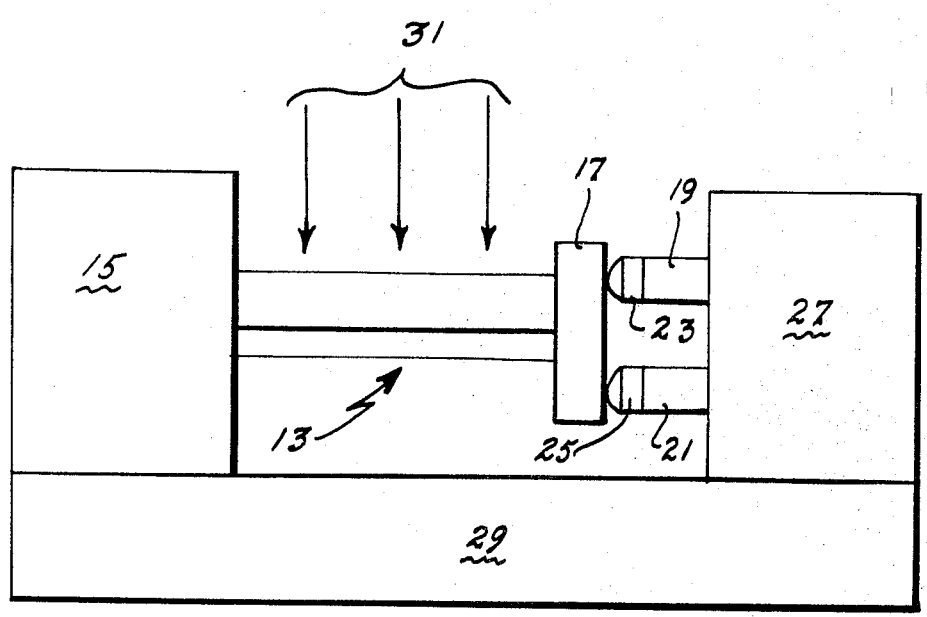

APPARATUS FOR THE DIRECT MEASUREMENTS OF THERMAL STRESSES

BACKGROUND OF THE INVENTION

This invention relates to an apparatus for measuring the stress generated in a material sample when it is heated while rigidly confined to prevent lateral expansion and, more particularly, the invention is concerned with providing a device for measuring both the direct thermal stress line load ($N_T$) and the thermal stress moment ($M_T$) at the same time.

The strength of materials branch of applied mechanics is concerned with the behavior of materials under load, relationships between externally applied loads and internal resisting forces, and associated deformations. Knowledge of the properties of materials and analysis of the forces involved are fundamental to the investigation and design of structures and machine elements. Mathematical application of principles of mechanics is supplemented by experimentally determined properties of materials and other empirical constants. The determination of the distribution and intensity of the internal forces and associated deformations is called stress analysis.

Internal reactive forces developed in response to straining actions depend on the magnitude and nature of the loads. Two important straining actions are (1) tension or compression, which lengthen or shorten the member, and (2) bending, in which couples or bending moments produce change in curvature. The most significant factors in determining the suitability of a structural or machine element for a particular application are strength and stiffness.

Machines for the mechanical testing of materials usually include elements for holding the sample, for deforming it, and for measuring the load required in performing the deformation. Some machines omit the measurement of load and substitute a measurement of deformation. In most general purpose testing machines, the deformation is controlled as the independent variable and the resulting load measured. It can be seen that none of these presently available testing machines is suitable for accurately measuring the stress generated in a material sample when it is heated while rigidly confined to prevent lateral expansion. Also, none of these machines is capable of measuring both the direct stress and the bending moment simultaneously.

SUMMARY OF THE INVENTION

The present invention is concerned with providing an apparatus for measuring the stress generated in a material when it is heated while rigidly confined to prevent lateral expansion and for measuring the bending moment in a material that is heated non-uniformly through its thickness. Both quantities can be measured at the same time.

The apparatus according to the invention includes a sample constrained between a support and a rigid member. Two spaced load measuring means extend outwardly from the outer surface of the rigid member to another support which is linked to the first support by a rigid base. The application of heat from an external source will produce thermal stress in the sample with a proportional effect on the load measuring means. Non-uniform heating of the sample through its thickness will produce a bending moment causing unequal loads on the spaced measuring means. The differences can be measured and the bending moment computed.

Accordingly, it is an object of the invention to provide an apparatus for measuring the thermal stresses in a solid material when it is heated while being rigidly confined to prevent lateral expansion.

Another object of the invention is to provide an apparatus which is suitable for measuring the lateral stresses and moments in a relatively small sample of a particular material or composite of interest where the azimuthal and/or axial constraints due to hoop configuration are replaced by externally, rigid, laterally constraining members.

Still another object of the invention is to provide an apparatus for measuring the bending moment produced in a material that is heated non-uniformly through its thickness.

A further object of the invention is to provide an apparatus which includes a longitudinal rigid base member with an upstanding support at each end thereof. One end of a material sample is positioned against the inner surface of one of the supports while the other end is positioned against a rigid member. A spaced load measuring means is positioned between the other support and the rigid member.

These and other objects, features and advantages will become more apparent after considering the following description taken in conjunction with the annexed drawing and appended claims.

BRIEF DESCRIPTION OF THE DRAWING

The FIGURE is a schematic view of an apparatus in side elevation showing the material sample in position with the support members and load measuring means arranged according to the invention.

DESCRIPTION OF A PREFERRED EMBODIMENT

Referring now to the drawing, there is shown in idealized form a testing apparatus including a material sample 13 constrained between a first support member 15 and a rigid member 17. The opposite side of the rigid member 17 is held against two mounts 19 and 21 which hold the load measuring means 23 and 25, respectively. These load measuring means may be, for example, a pair of quartz load washers which produce an electrical charge proportional to the applied force. The mounts 19 and 21 are, in turn, constrained by a second support member 27 which is linked to the first support member 15 by a rigid base 29.

Assuming that the members 15, 17, 27 and 29 as well as the quartz load washers 23 and 25 and their mounts 19 and 21, respectively, are all incompressible, when sample 13 heated from some external source of energy 31, it will not be able to expand laterally and a thermal stress will be developed. This stress will affect the quartz load washers 23 and 25, causing an electrical charge to appear across each washer. The charge may be measured by suitable electrical circuitry and the stress computed from this measurement. Further, if the sample 13 is heated non-uniformly through its thickness, the lateral stress will be unequal through the sample and a bending moment will be set up, causing unequal stresses on load washers 23 and 25. The difference in loadings can be measured and the moment thereby computed.

The two materials parameters that govern the magnitude of the thermal stress produced are Young's Modulus and the coefficient of thermal expansion, the stress being dependent on the product of these two parameters. Using the herein described invention, changes in either or both of these parameters can be monitored because, in times short enough for temperature distributions not to change, changes in either parameter will cause changes in the measured stress.

The hereinbefore described invention is particularly useful in the fields of research and engineering in that it enables certain mechanical properties of solid materials to be measured. A particular problem which arises in practice is when a cylindrical shell of composite structure, such as carbon phenolic-adhesive-aluminum, is subjected to an external heat source wherein the heating is directed to one side of the cylinder. The azimuthal and axial expansions of the cylinder are restrained by the rigidity of the structure and, as a result, aximuthal or hoop as well as axial stresses develop within the cylindrical wall. Since the heating is not uniform through the wall thickness, bending moments are also developed within the wall. The magnitude of the stress and moment affect the subsequent response of this cylinder. This problem is directly applicable to re-entry vehicles.

The present invention includes apparatus that is capable of measuring the lateral stresses and moments in a relatively small sample of the material or composite of interest, where the azimuthal and/or axial constraints due to hoop configuration are replaced by external, rigid, laterally-constraining members. It will be noted that the properties measured are characteristic of the materials or composites being studied. Thus, the utility of the invention or the data obtainable from it will not be limited to the problem outlined above.

Although the invention has been illustrated in the accompanying drawing and described in the foregoing specification in terms of a preferred embodiment thereof, the invention is not limited to this embodiment or to the preferred configuration mentioned. It will be apparent to those skilled in the art that my invention could have extensive use in other operations where it is desirable to measure the degradation of certain materials properties.

Having thus set forth the nature of my invention, what I claim and desire to secure by Letters Patent of the United States is:

1. An apparatus for the direct measurement of thermal stresses in a constrained sample, said apparatus comprising an elongated rigid base member, a first upstanding support at one end of said base member, a second upstanding support at the other end of said base member, a rigid member vertically positioned between said upstanding supports and spaced therefrom, the constrained sample being disposed in the space between said first upstanding support and said rigid member, means for applying heat to the constrained sample, and means for measuring the stresses in the constrained sample caused by changes in temperature therein, said measuring means being positioned in the space between and in contact with said rigid member and said second upstanding support, said rigid member being constrained from movement by said second upstanding support member and said measuring means, thereby transmitting compressive forces from said sample to said measuring means for the measurement of the compressive forces to indicate direct thermal stress line load and thermal stress moment in the sample, simultaneously.

2. The apparatus defined in claim 1 wherein the means for measuring the stresses in the constrained sample includes a pair of vertically spaced apart quartz load washers attached to two corresponding mounts, each of said quartz load washers producing an electrical signal proportional to the forces applied thereto.

* * * * *